No. 746,933. Patented December 15, 1903.

UNITED STATES PATENT OFFICE.

CHESTER B. DURYEA, OF SIOUX CITY, IOWA.

PROCESS OF PRODUCING MALTOSE.

SPECIFICATION forming part of Letters Patent No. 746,933, dated December 15, 1903.

Application filed October 2, 1902. Serial No. 125,700. (No specimens.)

*To all whom it may concern:*

Be it known that I, CHESTER B. DURYEA, a citizen of the United States, and a resident of Sioux City, in the county of Woodbury and State of Iowa, have invented a new and useful Process of Producing Maltose Syrups and Sugars, of which the following is a specification.

My invention relates to a process of producing maltose syrups and sugars, with the object in view of economizing time, fuel, and labor and increasing the yield, thereby bringing the cost of the concentrated product down to a competitive basis of cost with glucose products.

It is well recognized that malt converted or maltose products are more wholesome than and generally preferable to commercial glucose or grape-sugar, and attempts have been made from time to time to substitute these for the less desirable products derived from the acid conversion of starchy substances and commonly known as "glucose" and "grape-sugar." The expense and waste due to the considerable consumption of fuel and cost of labor during the extended time heretofore required for their production and concentration and poor yield have, however, up to the present time mainly prevented their general use.

The processes heretofore employed in producing maltose and the process which forms the subject-matter of my present invention have the same general steps, viz: first, the preparation of the starch or starchy material for treatment with the malt, a cooking process; second, treatment with malt; third, filtration, and, fourth, purification and evaporation. My process differs from those heretofore employed, first, in the preparation of the starch or starchy material itself, and, second, in the preparation of the starch or starchy material for the reception of the malt or malt extract. In the old processes the crude character of the raw materials employed introduced a large amount of impurities into the wort which were difficult and costly to remove, and not only this, but the wort produced was of such low specific gravity (rarely above 3° Baumé) that it required apparatus of great capacity and excessive labor to manipulate it and an extravagant fuel consumption for concentration. By my process the time of cooking the starchy material is reduced to about one-third or one-fourth that heretofore required. The first liquor or wort has a specific gravity of from 10° to 14° Baumé, and this wort is relatively very free from impurities and readily and quickly refined and concentrated.

My process in detail consists in first producing what is now known in the art as a "thin boiling or modified starch," (see United States Letters Patent No. 696,949, granted to me on the 8th day of April, 1902,) by treating the starchy material with acid in such a manner as to largely destroy the thick boiling character of the starch without breaking down the starch granules. This thin boiling or modified starch, mixed with water to make the mixture about 16° Baumé, while contained in a suitable converter of well-known or approved form provided, as is usual, with means for agitating the mass and with steam-supply for heating and water-jacket for cooling is treated with very dilute acid — for example, two and one-half hundredths of one per cent. hydrochloric acid, by weight. This acid may be allowed to remain from the step which converts the mass into the thin boiling or modified starch, or it may be introduced after the acid previously used for forming the thin boiling or modified starch has been neutralized. In either case the amount mentioned—viz., two and one-half hundredths of one per cent. when using hydrochloric acid—is to be free acid at the beginning of this step. The mass, while being thoroughly agitated, is then submitted to a cooking process under a steam-pressure of about three atmospheres for a period of from twenty to thirty minutes. The steam-pressure is then cut off and the mass cooled to about 70° to 75° centigrade. The charge is then neutralized to an extent which will leave it only faintly acid to litmus-paper. This neutralization may be accomplished by the introduction of a suitable alkali—as, for example, a weak solution of caustic soda. A portion of the malt is then added to the mass while the stirring is continued. The proportion of malt at first added is preferably about ten per cent., by weight, of total amount of malt to be used, and I prefer to add extract of malt rather than malt proper, as I find it advantageous to separate the non-active substances from the malt before the wort is formed rather than after. One of the reasons for using the extract is that the extracted malt or malt residue may be advantageously separately treated in the usual way for the saccharification of the starch it still contains, and the refining of the main wort is simpler and more economical. The mass is then cooled down to about 61° centigrade and the remainder of the malt or malt extract is added. The malt used should preferably be the so-called "green" malt and may be varied in relative amount, according to the type of product desired. About fifteen per cent., by weight, of the starch used may be taken as an average. The temperature is maintained at about 61° centigrade for about half an hour when malt extract is used, the stirring still going on, and the charge is then removed and filter-pressed. When the malt is added directly to the cooked and neutralized charge, the conversion temperature should of course be raised to about 70° centigrade for a period toward its completion in order to more effectively saccharify the starch of the malt. The thin syrup or wort produced may have a specific gravity of from about 10° to 14° Beaumé and may be purified and concentrated by evaporation in the usual way. The resulting product will represent a yield nearly up to the theoretical limit, and it will be almost entirely free from foreign matter.

The process above set forth in detail may be varied in many particulars to suit the varied character of the raw material or varied requirements of the product, the above being the particular procedure at present preferred.

What I claim is—

The process of producing maltose consisting in providing a thin boiling or modified starch having mixed therewith a very dilute acid, cooking the mixture, neutralizing the acid, treating the mass with malt and finally separating the maltose from the mass.

In testimony that I claim the foregoing as my invention I have signed my name, in presence of two witnesses, this 30th day of September, 1902.

CHESTER B. DURYEA.

Witnesses:
 FREDK. HAYNES,
 HENRY THIEME.